(12) United States Patent
Stevenson

(10) Patent No.: US 7,234,716 B2
(45) Date of Patent: Jun. 26, 2007

(54) VEHICLE STEP APPARATUS AND METHOD OF OPERATION THEREOF

(75) Inventor: Robin Stevenson, Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 318 days.

(21) Appl. No.: 10/720,635

(22) Filed: Nov. 24, 2003

(65) Prior Publication Data
US 2005/0110236 A1    May 26, 2005

(51) Int. Cl.
B60R 3/02 (2006.01)
(52) U.S. Cl. ..................................... 280/166
(58) Field of Classification Search ............... 280/163, 280/166, 164.1; 296/62, 146.9; 180/91, 180/127
See application file for complete search history.

(56) References Cited

U.S. PATENT DOCUMENTS

| | | | | |
|---|---|---|---|---|
| 2,146,668 A * | 2/1939 | Baade | .................. | 105/447 |
| 3,572,753 A * | 3/1971 | Claassen | .................. | 280/166 |
| 3,572,754 A * | 3/1971 | Fowler | .................. | 280/166 |
| 3,574,322 A * | 4/1971 | Hancock et al. | .................. | 180/271 |
| 3,608,957 A | 9/1971 | Maneck | .................. | 296/146 |
| 3,751,068 A * | 8/1973 | Green | .................. | 280/166 |
| 3,762,742 A * | 10/1973 | Bucklen | .................. | 280/166 |
| 3,784,227 A | 1/1974 | Rogge | .................. | 280/166 |
| 3,888,510 A * | 6/1975 | Maske | .................. | 280/166 |
| 3,980,319 A * | 9/1976 | Kirkpatrick | .................. | 280/166 |
| 4,131,209 A * | 12/1978 | Manning | .................. | 414/537 |
| 4,231,583 A * | 11/1980 | Learn | .................. | 280/166 |
| 5,137,294 A | 8/1992 | Martin | .................. | 280/166 |
| 5,257,847 A | 11/1993 | Yonehara | .................. | 296/151 |
| 5,358,268 A * | 10/1994 | Hawkins | .................. | 280/166 |
| 5,501,475 A | 3/1996 | Bundy | .................. | 280/166 |
| 5,513,866 A | 5/1996 | Sisson | .................. | 280/166 |
| 5,538,265 A * | 7/1996 | Chen et al. | .................. | 280/163 |
| 5,697,626 A * | 12/1997 | McDaniel et al. | .................. | 280/166 |
| 5,806,869 A | 9/1998 | Richards | .................. | 280/163 |
| 5,842,709 A | 12/1998 | Maccabee | .................. | 280/166 |
| 5,897,125 A | 4/1999 | Bundy | .................. | 280/166 |
| 6,029,989 A | 2/2000 | Stuart et al. | .................. | 280/163 |
| 6,135,472 A | 10/2000 | Wilson et al. | .................. | 280/166 |
| 6,149,172 A | 11/2000 | Pascoe et al. | .................. | 280/166 |
| 6,152,470 A | 11/2000 | Stuart et al. | .................. | 280/163 |
| 6,325,397 B1 | 12/2001 | Pascoe et al. | .................. | 280/166 |
| 6,375,207 B1 | 4/2002 | Dean et al. | .................. | 280/166 |
| 6,382,650 B1 | 5/2002 | Farkash | .................. | 280/164.1 |
| 6,406,045 B1 | 6/2002 | Farkash | .................. | 280/164.1 |
| 6,550,799 B2 | 4/2003 | Farkash | .................. | 280/163 |
| 7,017,927 B2 * | 3/2006 | Henderson et al. | .................. | 280/166 |
| 2002/0113400 A1 | 8/2002 | Leitner | .................. | 280/166 |
| 2003/0132595 A1 | 7/2003 | Fabiano et al. | .................. | 280/166 |

* cited by examiner

Primary Examiner—Christopher P. Ellis
Assistant Examiner—Bridget Avery
(74) Attorney, Agent, or Firm—Kathryn A. Marra

(57) ABSTRACT

A step apparatus for a vehicle having a door and a rocker panel includes a step disposed at and in operable communication with the door, wherein the step has a retracted position in response to the door being closed and a deployed position in response to the door being at least partially open. The vehicle has a first ground clearance in response to the door being closed and the step retracted and a second ground clearance in response to the door being open and the step deployed. The first ground clearance, which is defined by the vehicle and is independent of the step apparatus, is equal to or greater than the second ground clearance.

27 Claims, 3 Drawing Sheets

VEHICLE STEP APPARATUS AND METHOD OF OPERATION THEREOF

BACKGROUND OF THE INVENTION

The present disclosure relates generally to a step apparatus for a vehicle and method of operation thereof, and particularly to a step apparatus in operable communication with a door of the vehicle.

Vehicles having high road clearance, such as trucks and sport utility vehicles (SUV's) for example, and especially high-road-clearance vehicles suitable for non-off-road use, may be provided with permanent or retractable steps at one or more doorways for assisting a passenger who is embarking or disembarking the vehicle. While permanent or retractable steps may be suitable for their intended purpose, either type of step may result in some loss of ground clearance that may not be desirable. A permanent step may have a limited tread width as defined by the overall vehicle width, and a retractable step may have limited horizontal and vertical displacement between retracted and deployed positions. Accordingly, there is a need in the art for a step apparatus for a vehicle that overcomes these drawbacks.

SUMMARY OF THE INVENTION

In one embodiment, a step apparatus for a vehicle having a door and a rocker panel includes a step disposed at and in operable communication with the door, wherein the step has a retracted position in response to the door being closed and a deployed position in response to the door being at least partially open. The vehicle has a first ground clearance in response to the door being closed and the step retracted and a second ground clearance in response to the door being open and the step deployed. The first ground clearance, which is defined by the vehicle and is independent of the step apparatus, is equal to or greater than the second ground clearance.

In another embodiment, a step apparatus for a vehicle having a door and a door frame includes a step having a pivot disposed proximate the door frame and a bias force biasing the step in a retracted position, where the retracted position is in response to the door being closed. The step has a fully deployed position in response to the door being at least partially open. The step rotates vertically from the retracted position to the deployed position about the pivot in response to the door being opened. The door has a drive surface for engaging the step to drive the step to the deployed position against the bias force.

In a further embodiment, a method of operating a step of a vehicle is disclosed. The door of the vehicle is opened and via the opening action, the step is vertically rotated from a retracted substantially vertical position to a deployed substantially horizontal position. The rotational motion of the step is in opposition to a bias force biasing the step in the retracted position. At the deployed position, the step is locked in position.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a step apparatus for a vehicle. The step apparatus is actuated between retracted and deployed positions by the movement of a door of the vehicle and absent motorized assistance. The deployed position provides ease of entry into the vehicle, while the retracted position provides a means of stowing the step apparatus without reducing the vehicle ground clearance.

Figure 1:
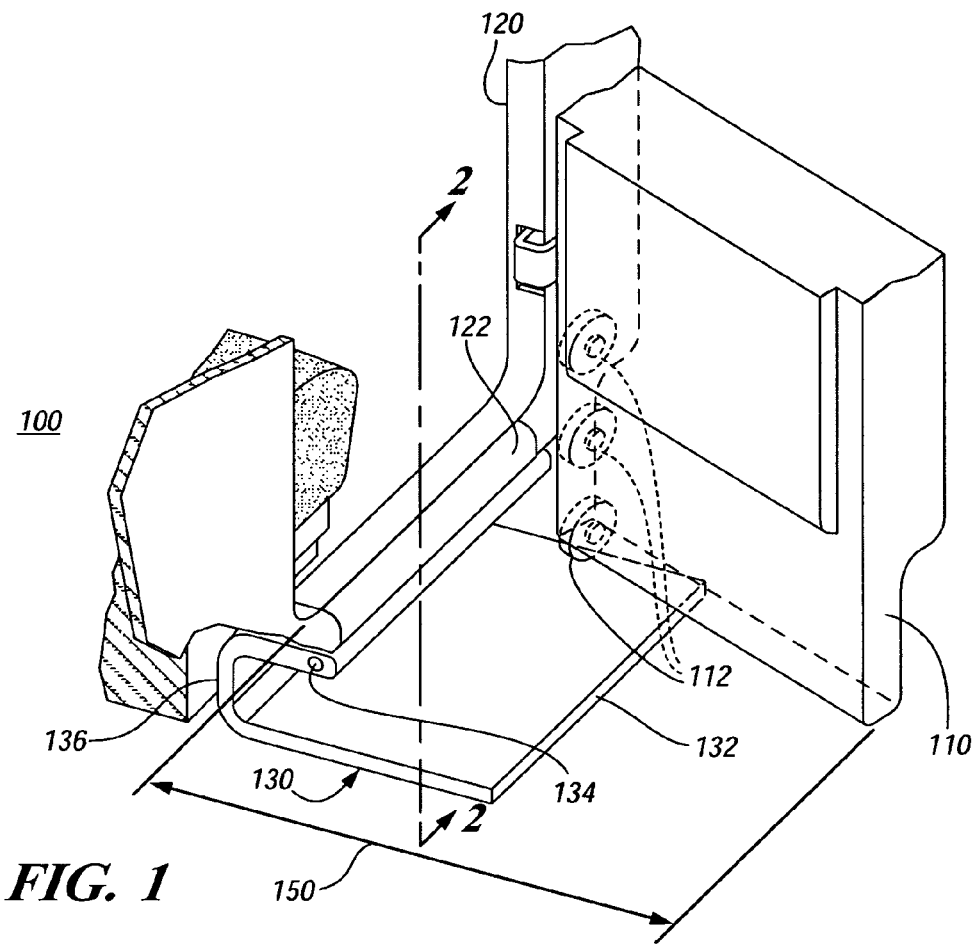
FIG. 1 depicts a partial isometric view of a vehicle implementing an embodiment of the invention.

FIG. 1 is an exemplary embodiment of a partial isometric view of a vehicle 100 having a door 110, a door frame 120, and a step apparatus 130. The bottom portion 122 of the door frame is also referred to as a rocker panel. Step apparatus 130 includes a step 132, a pivot 134, and an offset arm 136 that serves to offset step 132 relative to pivot 134. Pivot 134 is coupled to vehicle 100 proximate to rocker panel 122. FIG. 1 depicts door 110 in an open position and step 132 in a deployed position. Door 110 includes drive surfaces 112, such as a drive wheels or rollers for example, that are arranged within door 110 for interacting with step apparatus 130, and particularly step 132, for driving step 132 from a retracted position depicted in FIG. 2 to the deployed position depicted in FIG. 1. Step 132 rotates vertically about pivot 134 between retracted and deployed positions, that is, the axis of pivot 134 is horizontal and step 132 rotates up and down.

Figure 2:
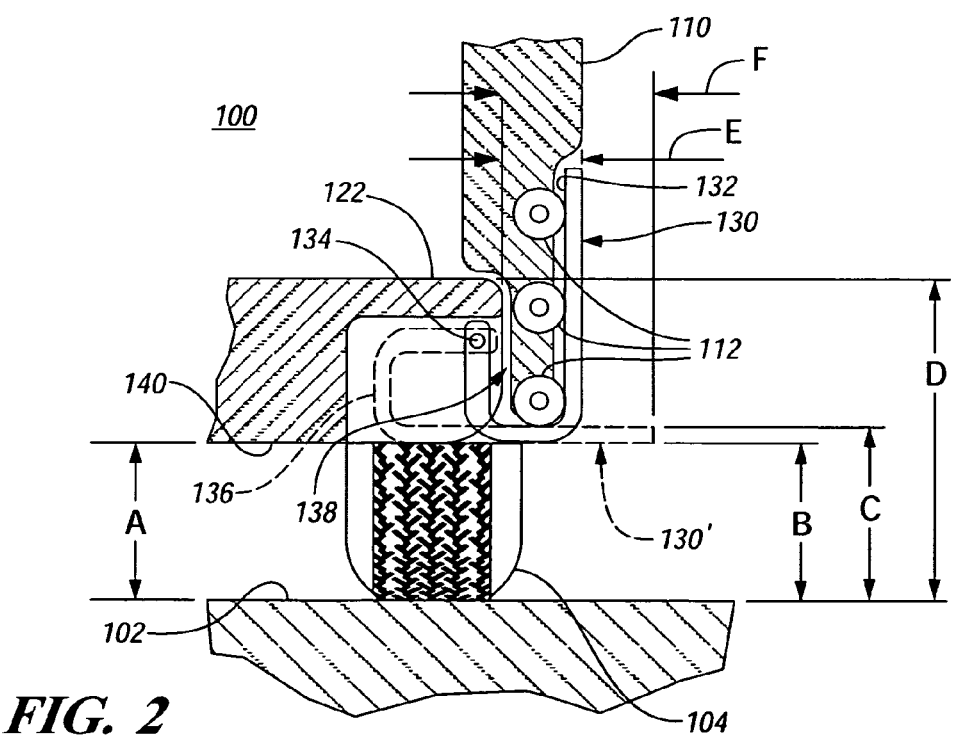
FIG. 2 depicts an alternative view of the embodiment of FIG. 1.

Referring now to FIG. 2, a section cut through door 110 and step apparatus 130 is depicted with door 110 in a closed position and step 132 in the retracted position. Step apparatus is shown in solid line fashion at 130 to depict a retracted position, and in a dashed line fashion at 130' to depict a deployed position.

In the closed and retracted position (FIG. 2), door 110 is closed, and step 132 is biased counterclockwise about pivot 134, via a bias force, a bias spring, or other suitable means, depicted generally at arrow 138, to the retracted position. Bias force 138 may also be coupled with a rotational damper (also depicted generally by numeral 138) for damping the movement of step 132 toward the retracted position. In the retracted position, vehicle 100 has a first ground clearance A that is defined by the distance between ground 102 (bottom of wheel 104) and the underside of vehicle chassis 140, and not by a dimension from ground 102 to step apparatus 130. As door 110 moves from the closed position of FIG. 2 to the open position of FIG. 1, drive surfaces 112 within door 110 engage step 132 to rotate step 132 clockwise about pivot 134. While three drive wheels 112 are depicted as drive surfaces, it will be appreciated that any appropriate number of drive wheels 112 may be employed. Drive wheels 112 interact with step 132 in such a manner so as to create the clockwise motion of step 132, which may require the uppermost drive wheel 112 to engage step 132 prior to engagement of the lowermost drive wheel 112. As door 110 rotates open and step 132 rotates clockwise toward the deployed position, the moment arm between pivot 134 and the line of force acting through drive wheel 112 increases, thereby enabling the lowermost drive wheel 112 to drive step 132 to its fully deployed position. The geometry between drive wheels 112 and step 132 is appropriately defined to enable the clockwise pivot action of step 132. In the fully deployed position, as depicted by the dashed lines in FIG. 2, step 132 defines a second ground clearance B that may be equal to or less than first ground clearance A, and a step entry elevation C that is less than a step elevation D defined by the absence of step 132. In an embodiment, step elevation C is about 50 percent of step elevation D.

The lateral open dimension 150 of door 110 defines the point at which step 132 is fully deployed. In an embodiment, step 132 is fully deployed at a lateral open dimension 150 of equal to or less than about 28 inches. In another embodiment, step 132 is fully deployed at a lateral open dimension 150 of equal to or less than about 15 inches. It will be appreciated that in view of the dimensional tolerances among and between the several parts that define the exact point of a fully deployed step 132, the exact lateral open dimension 150 may vary somewhat and is not critical to an understanding of the invention.

With respect to the outer edge of rocker panel 122, the outermost point of step 132 has a first horizontal displacement E when in the retracted position, and a second horizontal displacement F when in the deployed position, such that displacement F is greater than displacement E. In an embodiment, displacement F is equal to or greater than about 6 inches, in another embodiment, displacement F is equal to or greater than about 9 inches, and in yet another embodiment, displacement F is equal to or less than about 15 inches. It will be appreciated that in view of the dimensional tolerances among and between the several parts that define the exact location of the outermost point of step 132, the exact dimension of displacement F may vary somewhat and is not critical to an understanding of the invention.

Figure 3:
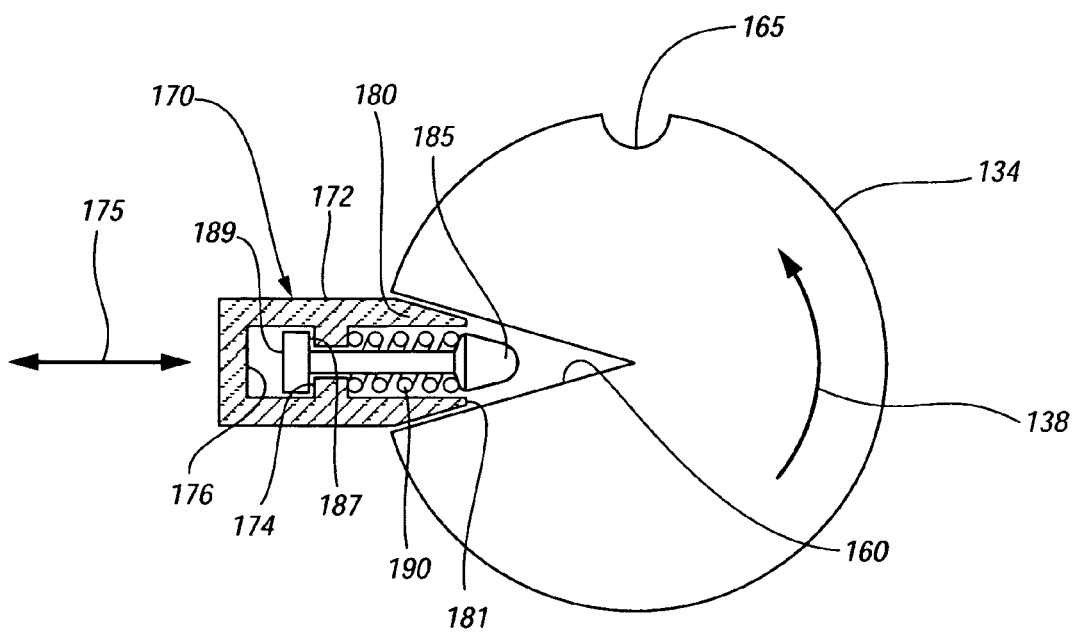
FIG. 3 depicts an enlarged view of an exemplary pivot in accordance with an embodiment of the invention.

Referring now to FIG. 3, an enlarged view of a section of pivot 134 is depicted having a locking surface 160 and a retaining surface 165. A latch mechanism 170 is in operable communication with pivot 134, and with door 110 via linkage 175. Latch mechanism 170 includes a body 172, a locking portion 180, and a retaining portion 185. Retaining portion is biased toward the center of pivot 134 via bias spring 190. Stop surfaces 187, 174 prevent retaining portion 185 from ejecting out of body 172. Retaining portion 185 may be pushed into body 172 until end 189 contacts stop surface 176. When step 132 is fully deployed, locking portion 180 engages with locking surface 160 to lock step 132 in the deployed position, as depicted in FIG. 3. When door 110 closes, linkage 175, responsive to the closing action of door 110, disengages locking portion 180 from locking surface 160 sufficient to permit pivot 134 to rotate counterclockwise under the influence of rotational bias force 138, thereby enabling step 132 to move to the retracted position. During the counterclockwise rotation of pivot 134, the end 181 of locking portion 180 sufficiently clears the outer diameter of pivot 134, but retaining portion 185 does not. Instead, retaining portion is cammed into body 172 against the force of bias spring 190. In an embodiment, retaining portion 185 may be viewed as a cam follower, and the outer diameter of pivot 134 may be viewed as a cam surface, thereby providing a cam and cam follower arrangement. It will be appreciated that other cam and cam follower arrangements and geometries may be employed without detracting from the scope of the invention. When step 132 and pivot 134 reach the retracted position, retaining portion 185 is driven out of body 172 under the influence of bias spring 190 to engage retaining surface 165, thereby retaining step 132 in the retracted position.

In response to door 110 being moved from the closed position to the open position, retaining portion 185 is driven, or cammed, out of engagement with retaining surface 165 in opposition of bias spring force 190, thereby enabling step 132 to rotate and move to the deployed position. In an alternative embodiment, not only may retaining portion 185 be cammed out of engagement with retaining surface 165, but retaining portion 185 may also be unlatched from engagement with retaining surface 165 via linkage 175 acting upon latch mechanism 170. Here, linkage 175 may be cooperatively connected with a handle (not shown) of door 110, thereby enabling the unlatching of latch mechanism 170 in response to the door handle being actuated. In this manner, step 132 may be securely stowed and forcibly deployed if necessary.

An embodiment of the invention may include several latch mechanisms 170 distributed along the axial length of pivot 134, thereby providing a means for generating sufficient forces for locking step 132 in the deployed position and retaining step 132 in the retracted position.

While an embodiment of the invention is depicted having a step apparatus that is actuated between retracted and deployed positions by the movement of a door of the vehicle and absent motorized assistance, it will be appreciated that motorized assistance may be included for remote operation or other purposes.

Figure 4:
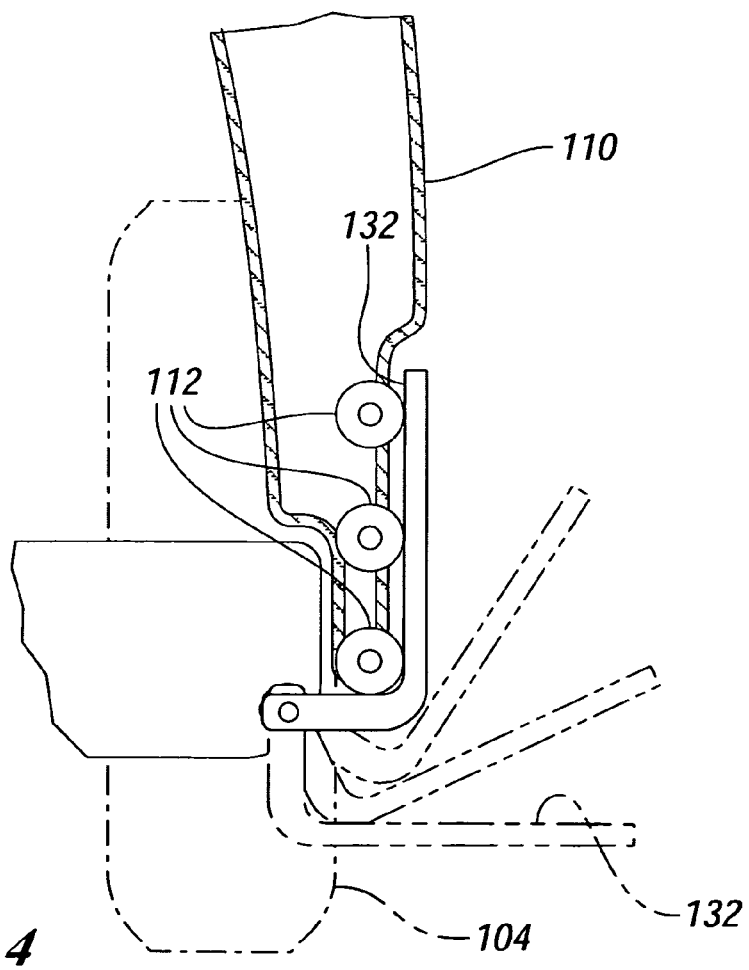
FIGS. 4–6 depict alternative embodiments to that depicted in FIGS. 1 and 2.
Figure 5:
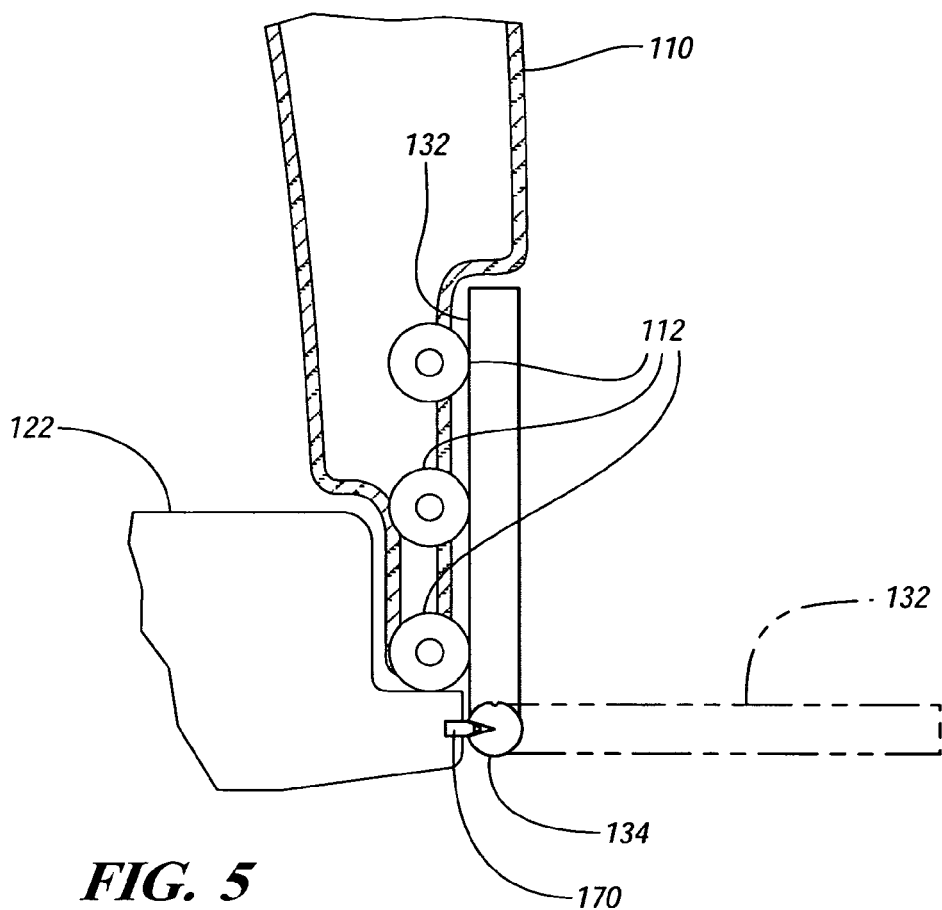

Alternative embodiments of the invention are illustrated in FIGS. 4 and 5. FIG. 4 depicts an L-shaped step 132 in varies positions between retracted (solid line) and deployed (dashed line) positions, and FIG. 5 depicts a flat step 132 in both retracted (solid line) and deployed (dashed line) positions. In viewing the varied embodiments, it will be appreciated that other shapes for step 132 may be employed without detracting from the scope of the invention.

The movement of step 132 from a retracted position to a deployed position is accomplished by opening door 110 of vehicle 100, engaging drive surface 112 with step 132, and via the opening action of door 110 vertically rotating step 132 from a retracted substantially vertical position to a deployed substantially horizontal position. As used herein, the terms substantially vertical and substantially horizontal refer to orientations of step 132 convenient for stowing against door 110 and for using as a horizontal step, which may depart somewhat from an exact vertical or horizontal orientation due to tolerance accumulation or design. The rotation of step 132 occurs in opposition to a bias force 138 that biases step 132 toward the retracted position. At the point of full deployment, step 132 is locked in position.

The movement of step 132 from the deployed position to the retracted position is accomplished by closing door 110 of vehicle 100, and in response to door 110 being closed, unlocking step 132 from the deployed position via motion of linkage 175. When unlocked, step 132 is then free to rotate vertically under the influence of retracting bias force 138 from the deployed substantially horizontal position to the retracted substantially vertical position. When in the retracted position, step 132 is held in place via a cam 134 (outer surface of pivot 134) and cam follower 185 (retaining portion 185) arrangement. Here, cam 134 is represented by the outer surface of pivot 134 and cam follower 185 is represented by retaining portion 185, but other cam/cam-follower arrangements may also be employed. In an alternative embodiment, the rotation of step 132 from the deployed position to the retracted position may be accomplished using a damping device, such as an oil filled rotational damper for example, thereby reducing the impact of step 132 against door 110 as it reaches the end of its travel.

Figure 6:
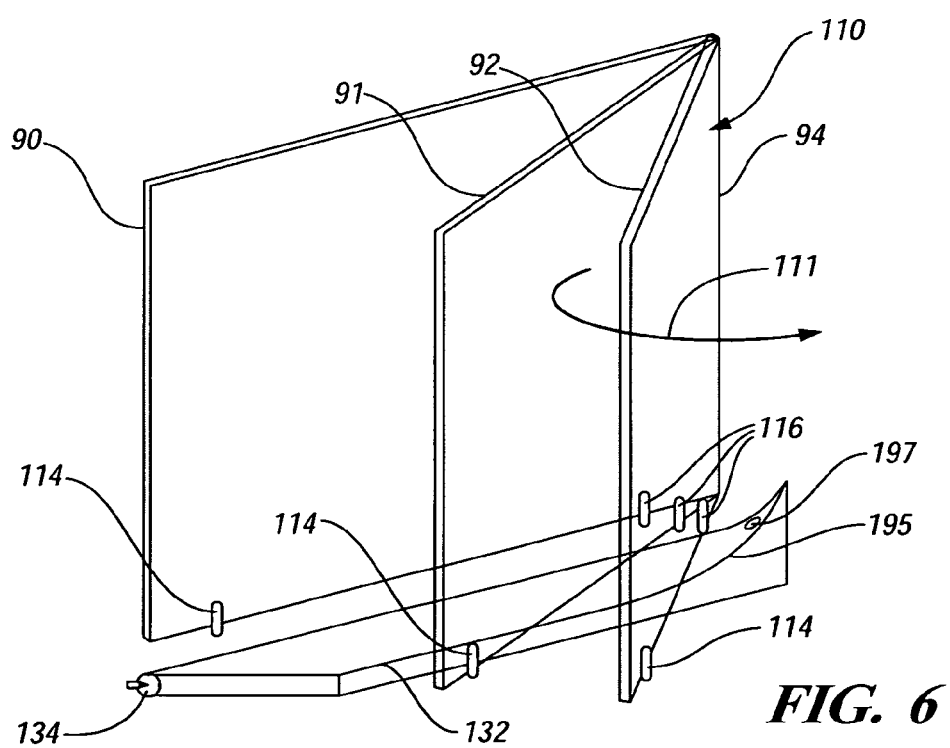

An alternative embodiment of step 132 includes a ramp portion 195 proximate the door pivot axis 94, best seen by now referring to FIG. 6. As door 110 opens in the direction of arrow 111 from a closed position 90 to a partially open position 91, drive surface 114 engages step 132 to begin the deployment process. As door 110 continues to open from the partially open position 91 to a substantially open position 92, drive surface 116 engages ramp portion 195, thereby driving step 132 to a fully deployed position. By appropriately dimensioning the distance between drive surface 114 and step 132, and the distance between drive surface 116 and ramp portion 195, the desired mechanical advantage may be achieved for smoothly deploying step 132 as door 110 swings about axis 94. Drive surfaces 114, 116 may be slip pads, drive wheels, or any other means for imparting a driving force to step 132. As an added feature, ramp portion 195 may include a light 197 angled appropriately to illuminate step 132 during entry and exit.

While an embodiment of the invention has been disclosed with a door having a pivot action, it will be appreciated that a door having a sliding action may also be capable of interacting with a ramp system to deploy a step. Accordingly, the scope of the invention is not limited to pivoting doors only.

As disclosed, some embodiments of the invention may include some of the following advantages: no reduction in vehicle ground clearance with the step stowed in the retracted position; no increase in vehicle width with step stowed in the retracted position; wide step tread with the width being defined by application rather than vehicle structure; automatic deployment and retraction of the step with the opening and closing action of the door absent a need for motor assistance; and, full deployment of the step with only partial opening of the door.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A step apparatus for a vehicle having a door and a rocker panel, the apparatus comprising:
    a step disposed at and in operable mechanical communication with the door, the step having a retracted position in response to the door being closed and capable of having a fully deployed position in response to the door being only partially open;
    wherein the vehicle has a first ground clearance in response to the door being closed and the step retracted, and a second ground clearance in response to the door being open and the step deployed, the first ground clearance being equal to or greater than the second ground clearance; and
    wherein the first ground clearance is defined by the vehicle independent of the step apparatus.

2. The apparatus of claim 1, wherein:
    the step is fully deployed in response to the door moving from a closed position to a partially open position.

3. The apparatus of claim 1, wherein:
    with respect to the rocker panel, the step has a first horizontal displacement in the retracted position and a second horizontal displacement in the deployed position, the second horizontal displacement being greater than the first horizontal displacement.

4. The apparatus of claim 1, wherein:
    the step is biased toward the retracted position;
    the door includes a drive surface for driving the step to the deployed position in response to the door being opened; and
    the step is locked in the deployed position when driven to the deployed position.

5. The apparatus of claim 1, wherein the step moves to and from the deployed position and to and from the retracted position in the absence of motor assistance.

6. The apparatus of claim 1, wherein:
    the step includes an offset pivot about which the step rotates vertically between the retracted and deployed positions, the step in the deployed position providing an entry elevation that is less than the entry elevation in the absence of the step.

7. The apparatus of claim 1, wherein:
    the step is biased toward the refracted position; and
    an exterior of the door comprises a drive surface configured to interact with the step to drive the step to the deployed position in response to the door being opened.

8. The apparatus of claim 2, wherein the partially open position results from a lateral door movement of equal to or less than about 28 inches.

9. The apparatus of claim 8, wherein the partially open position results from a lateral door movement of equal to or less than about 15 inches.

10. The apparatus of claim 3, wherein the second horizontal displacement is equal to or greater than about 6-inches.

11. The apparatus of claim 10, wherein the second horizontal displacement is equal to or greater than about 9-inches.

12. The apparatus of claim 10, wherein the second horizontal displacement is equal to or less than about 15-inches.

13. The apparatus of claim 4, farther comprising:
    a pivot having a locking surface and a retaining surface, wherein the step rotates about the pivot; and
    a latch mechanism in operable communication with the door, the latch mechanism having a locking portion and a retaining portion;
    wherein the locking portion engages the locking surface to lock the step in the deployed position.

14. The apparatus of claim 4, wherein:
    the step includes a ramp portion; and
    the drive surface includes a second drive surface arranged to engage with the ramp portion in response to the door moving from a partially open position to a substantially open position.

15. The apparatus of claim 13, wherein:
    in response to the door being moved from an open position to a closed position, the locking portion of the latch mechanism is disengaged from the locking surface, the step is biased toward and moves to the retracted position, and the retaining portion of the latch mechanism is driven under the influence of a bias force to engage the retaining surface to retain the step in the retracted position.

16. The apparatus of claim 15, wherein:

in response to the door being moved from the closed position to the open position, the retaining portion of the latch mechanism is driven, in opposition to the bias force, out of engagement with the retaining surface, thereby enabling the step to move to its deployed position.

17. The apparatus of claim 15, further comprising:

a damper disposed between the step and the vehicle, the damper adapted to dampen the movement of the step from the deployed position to the refracted position.

18. The apparatus of claim 6, wherein the entry elevation in the presence of the step is about 50 percent of the entry elevation in the absence of the step.

19. The apparatus of claim 14, wherein the ramp portion includes a light.

20. A step apparatus for a vehicle having a door and a door frame, the apparatus comprising:

a step having a pivot, the pivot disposed proximate the door frame, the step having a retracted position in response to the door being closed and a fully deployed position in response to the door being only partially open; and a bias force biasing the step in the retracted position;

wherein the step rotates vertically from the retracted position to the deployed position about the pivot in response to the door being opened, the door having a drive surface for engaging the step to drive the step to the deployed position against the bias force.

21. The apparatus of claim 20, further comprising:

a latch mechanism in operable communication with the door and the step, the latch mechanism having a locking position and a retaining position, the locking position locking the step in the fully deployed position in response to the door being opened, the retaining position retaining the step in the refracted position in response to the door being closed;

wherein in response to the door being opened, the latch mechanism is driven out of the retaining position thereby enabling the step to be driven to the deployed position; and wherein in response to the door being closed, the latch mechanism is disengaged from the locking position thereby enabling the step under the influence of the bias force to be driven to the retracted position.

22. The apparatus of claim 21, wherein:

the step is oriented in a substantially vertical plane in the retracted position and in a substantially horizontal plane in the deployed position; and the step in the deployed position has a lateral dimension with respect to the door frame of equal to or greater than about 6-inches and equal to or less than about 18-inches.

23. The apparatus of claim 22, wherein:

the step in the deployed position has a lateral dimension with respect to the door frame of equal to or greater than about 9-inches and equal to or less than about 15-inches.

24. A method of operating a step of a vehicle, the method comprising:

only partially opening a door of the vehicle;

via the only partially opening action of the door, and in response to the step being in operable mechanical communication with the door, mechanically rotating the step vertically from a retracted substantially vertical position to a fully deployed substantially horizontal position, the rotating being in opposition to a bias force biasing the step in the retracted position; and locking the step in the deployed position.

25. The method of claim 24, further comprising:

closing the door of the vehicle;

in response to the door being closed, unlocking the step from the deployed position;

under the influence of the bias force, rotating the step vertically from the deployed substantially horizontal position to the refracted substantially vertical position; and holding the step in the retracted position via a cam and cam follower arrangement.

26. The method of claim 24, wherein:

the mechanically rotating the step vertically from a refracted substantially vertical position to a fully deployed substantially horizontal position, is in the absence of motorized assistance.

27. The method of claim 25, wherein the rotating the step from the deployed position to the refracted position further comprises damping the rotating of the step from the deployed position to the retracted position.

* * * * *